US012664890B2

(12) United States Patent
Wang et al.

(10) Patent No.: US 12,664,890 B2
(45) Date of Patent: Jun. 23, 2026

(54) SYSTEMS AND METHODS FOR RESPONDING TO A NEGOTIATION REQUEST FOR COOPERATIVE MANEUVERING AMONG CONNECTED VEHICLES

(71) Applicant: Toyota Motor Engineering & Manufacturing North America, Inc., Plano, TX (US)

(72) Inventors: Hao M. Wang, Mountain View, CA (US); Sergei S. Avedisov, Mountain View, CA (US); Onur Altintas, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 18/368,701

(22) Filed: Sep. 15, 2023

(65) Prior Publication Data

US 2025/0095491 A1 Mar. 20, 2025

(51) Int. Cl.
*G08G 1/0967* (2006.01)
*B60W 60/00* (2020.01)

(52) U.S. Cl.
CPC ... *G08G 1/096791* (2013.01); *B60W 60/0015* (2020.02); *B60W 2520/10* (2013.01); *B60W 2554/4041* (2020.02); *B60W 2556/65* (2020.02)

(58) Field of Classification Search
CPC ..... B60W 2520/10; B60W 2554/4041; B60W 2556/65; B60W 60/0015; G08G 1/096791
See application file for complete search history.

(56) References Cited

U.S. PATENT DOCUMENTS

| | | | |
|---|---|---|---|
| 11,151,880 B1 * | 10/2021 | Shou | G08G 1/0141 |
| 11,377,118 B2 | 7/2022 | Fuchs et al. | |
| 11,407,429 B2 | 8/2022 | Ahmad et al. | |
| 11,535,247 B2 | 12/2022 | Fuchs et al. | |
| 11,711,680 B2 | 7/2023 | Yang | |
| 2017/0158175 A1 * | 6/2017 | Fairfield | G05D 1/0088 |

(Continued)

OTHER PUBLICATIONS

H. M. Wang, S. S. Avedisov, T. G. Molnár, A. H. Sakr, O. Altintas, and G. Orosz, "Conflict analysis for cooperative maneuvering with status and intent sharing via V2X communication," in IEEE Transactions on Intelligent Vehicles, vol. 8, No. 2, pp. 1105-1118, 2023.

(Continued)

*Primary Examiner* — Babar Sarwar

(74) *Attorney, Agent, or Firm* — Dinsmore & Shohl LLP

(57) ABSTRACT

An ego vehicle includes a controller configured to obtain a maneuver message from a first remote vehicle, which includes a negotiation request related to a maneuver to be performed by the first remote vehicle, determine a degree of conflict based on a position and a velocity of the ego vehicle, and driving information of the first remote vehicle, determine whether to accept the negotiation request based on the degree of conflict, send a maneuver message including an alternative suggestion to the first remote vehicle in response to determining to reject the negotiation request, and control the ego vehicle based on a negotiation result.

20 Claims, 11 Drawing Sheets

(56)            References Cited

U.S. PATENT DOCUMENTS

| | | | |
|---|---|---|---|
| 2017/0330461 A1* | 11/2017 | Caveney | G08G 1/161 |
| 2018/0284810 A1 | 10/2018 | Strunck et al. | |
| 2019/0088135 A1* | 3/2019 | Do | G01C 21/3492 |
| 2019/0212156 A1* | 7/2019 | Ghannam | B60K 35/28 |
| 2019/0243381 A1 | 8/2019 | Ahmad et al. | |
| 2020/0114920 A1* | 4/2020 | Zhang | H04L 9/0891 |
| 2020/0342760 A1* | 10/2020 | Vassilovski | B60W 30/18159 |
| 2021/0245758 A1* | 8/2021 | Ahmad | G08G 1/167 |
| 2021/0300418 A1* | 9/2021 | Alvarez | G08G 1/096791 |
| 2021/0360373 A1* | 11/2021 | Yang | H04W 4/46 |
| 2021/0385630 A1* | 12/2021 | Yang | H04W 4/24 |
| 2022/0097690 A1* | 3/2022 | Dede | G01C 21/3461 |
| 2022/0262253 A1* | 8/2022 | Wu | G08G 1/091 |
| 2022/0340177 A1* | 10/2022 | Khayatian | B60W 30/18154 |
| 2023/0047689 A1* | 2/2023 | Lee | G08G 1/166 |
| 2023/0131851 A1* | 4/2023 | Yu | G08G 1/166 |
| | | | 701/301 |
| 2023/0137808 A1* | 5/2023 | Avedisov | G08G 1/163 |
| | | | 701/117 |
| 2023/0159054 A1* | 5/2023 | Jespersen | B60W 60/0015 |
| | | | 701/23 |
| 2023/0230471 A1* | 7/2023 | Guney | G08G 1/0133 |
| | | | 701/26 |
| 2023/0264714 A1* | 8/2023 | Jung | B60W 60/0018 |
| | | | 701/23 |
| 2025/0030505 A1* | 1/2025 | Zahid | G06N 20/00 |

OTHER PUBLICATIONS

R. Molina Masegosa, S. S. Avedisov, M. Sepulcre, Y. Z. Farid, J. Gozalvez, O. Altintas, "V2X Message Generation Rules for Maneuver Coordination in Connected Automated Driving", IEEE Vehicular Technology Magazine, pp. 1-8, 2023.

SAE International, Surface Vehicle Standard, "Application Protocol and Requirements for Maneuver Sharing and Coordinating Service", pp. 1-59, 2016.

* cited by examiner

*100*

*160*

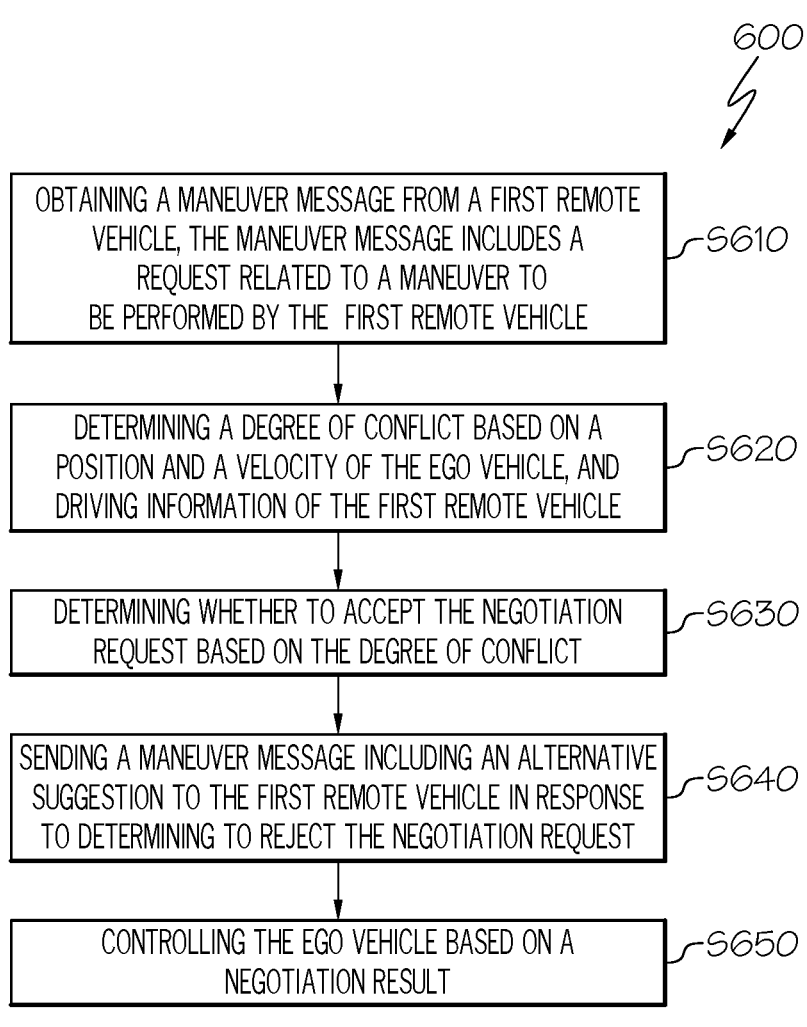

*600*

OBTAINING A MANEUVER MESSAGE FROM A FIRST REMOTE VEHICLE, THE MANEUVER MESSAGE INCLUDES A REQUEST RELATED TO A MANEUVER TO BE PERFORMED BY THE FIRST REMOTE VEHICLE ⟋S610

DETERMINING A DEGREE OF CONFLICT BASED ON A POSITION AND A VELOCITY OF THE EGO VEHICLE, AND DRIVING INFORMATION OF THE FIRST REMOTE VEHICLE ⟋S620

DETERMINING WHETHER TO ACCEPT THE NEGOTIATION REQUEST BASED ON THE DEGREE OF CONFLICT ⟋S630

SENDING A MANEUVER MESSAGE INCLUDING AN ALTERNATIVE SUGGESTION TO THE FIRST REMOTE VEHICLE IN RESPONSE TO DETERMINING TO REJECT THE NEGOTIATION REQUEST ⟋S640

CONTROLLING THE EGO VEHICLE BASED ON A NEGOTIATION RESULT ⟋S650

FIG. 6

SYSTEMS AND METHODS FOR RESPONDING TO A NEGOTIATION REQUEST FOR COOPERATIVE MANEUVERING AMONG CONNECTED VEHICLES

TECHNICAL FIELD

The present disclosure relates to systems and methods for responding to a negotiation request for cooperative maneuvering among connected vehicles.

BACKGROUND

Negotiation is a type of cooperative maneuvering that allows vehicles to coordinate complex maneuvers together. Such vehicles may be able to perform complex maneuvers such as platooning, merging, lane changing, or intersection crossing simultaneously, in a way that allows them to work towards a common goal. Negotiation may bring benefits in scenarios where vehicles may not cooperate.

However, conventional systems and methods may not specify when an ego vehicle respond to a negotiation request from a remote vehicle. Since the negotiation involves remote vehicles exchanging multiple messages before initiating the cooperative maneuver, it is desired to determine an appropriate response for the ego vehicle to respond to a negotiation request.

Accordingly, a need exists for systems and methods that respond a negotiation request to provide effective implementation of agreement seeking cooperation using maneuver messages.

SUMMARY

The present disclosure provides systems and methods for responding to a negotiation request for cooperative maneuvering among connected vehicles, such as remote vehicles. With a determination of degrees of conflict in the conflict zone, the systems and methods determine whether to accept the negotiation request from the first remote vehicle, send a maneuver message including an alternative suggestion to the first remote vehicle in response to determining to reject the negotiation request, and control the ego vehicle based on a negotiation result within an appropriate time, thereby avoiding an undesirable situation.

In one or more embodiments, an ego vehicle includes a controller configured to obtain a maneuver message from a first remote vehicle, the maneuver message including a negotiation request related to a maneuver to be performed by the first remote vehicle, determine a degree of conflict based on a position and a velocity of the ego vehicle, and driving information of the first remote vehicle, determine whether to accept the negotiation request based on the degree of conflict, send a maneuver message including an alternative suggestion to the first remote vehicle in response to determining to reject the negotiation request, and control the ego vehicle based on a negotiation result.

In another embodiment, a method for responding a request for a negotiation, the method comprising obtaining a maneuver message from a first remote vehicle, the maneuver message including a negotiation request related to a maneuver to be performed by the first remote vehicle, determining a degree of conflict based on a position and a velocity of the ego vehicle, and driving information of the first remote vehicle, determining whether to accept the negotiation request based on the degree of conflict, sending a maneuver message including an alternative suggestion to the first remote vehicle in response to determining to reject the negotiation request, and controlling the ego vehicle based on a negotiation result.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 6 depicts a flowchart for a method of responding to a request for a negotiation request, according to one or more embodiments shown and described herein.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The embodiments disclosed herein include systems and methods for responding to a request for a negotiation based on a degree of conflict in a conflict zone. With a determination of degrees of conflict in the conflict zone, the systems and methods determine whether to accept the negotiation request from the first remote vehicle, send a maneuver message including an alternative suggestion to the first remote vehicle in response to determining to reject the negotiation request, and control the ego vehicle based on a negotiation result within an appropriate time, thereby avoiding an undesirable situation.

As used herein, the term "Basic Safety Message (BSM)" may refer to a wireless message transmitted between vehicles where the transmitter sends its position, speed and other static or dynamic information. This type of message may be standardized by Society of Automotive Engineers (SAE).

As used herein, the term "Maneuver Message (MM)" may refer to a general class of wireless messages exchanged between road users, such as the ego vehicle, and infrastructure that contains the future trajectory or possible future trajectories) of the transmitting road user. Specific examples of such messages could be the Maneuver Coordination Message (MCM) undergoing standardization by European Telecommunications Standards Institute (ETSI) or the Maneuver Sharing Coordination Message (MSCM) currently being standardized by SAE.

As used herein, the term "Sensor Data Message (SDM)" may refer to a general class of wireless messages exchanged among road users, and between road users and infrastructure. Each SDM may contain information about detected objects (class of object, position of object, speed of object, size of object). Specific examples of such messages could be the Collective Perception Message (CPM) undergoing standardization by ETSI and the Sensor Data Sharing Message (SDSM) currently being standardized by SAE.

FIGS. 1A-1D schematically depict an exemplary embodiment of responding a request for a negotiation including lane exchanges on a road, according to one or more embodiments shown and described herein.

Figure 1A:
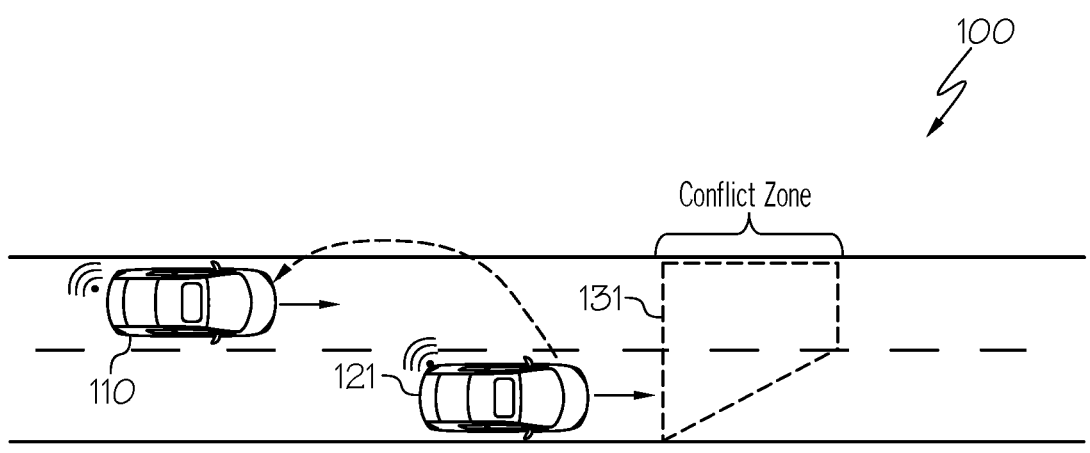
FIGS. 1A-1D schematically depict an exemplary embodiment of responding to a request for a negotiation including lane exchanges on a road, according to one or more embodiments shown and described herein.

Referring to FIG. 1A, the ego vehicle 110, and the first remote vehicle 121 may be on a road having at least two lanes. A first conflict zone 131 may exist in the front of the ego vehicle 110 and the first remote vehicle 121. The first conflict zone 131 is a zone where a conflict may exist between the ego vehicle 110 and the first remote vehicle 121 when the first remote vehicle 121 merges into the lane in which the ego vehicle 110 is driving. The distance between the first remote vehicle 121 and the first conflict zone 131 is closer than the distance between the ego vehicle 110 and the first conflict zone 131. The first remote vehicle 121 may be in the right lane of the two-lane road. The ego vehicle 110 may be in the left lane of the two-lane road.

The ego vehicle 110, the first remote vehicle 121, or both, may be a vehicle including an automobile or any other passenger or non-passenger vehicle such as, for example, a terrestrial, aquatic, and/or airborne vehicle. In some embodiments, the ego vehicle 110, the first remote vehicle 121, or both, may be an autonomous driving vehicle. For example, the ego vehicle 110, the first remote vehicle 121, or both, may be vehicles with SAE level 3 or more autonomy. The ego vehicle 110, the first remote vehicle 121, or both, may be an autonomous vehicle that navigates its environment with limited human input or without human input. The ego vehicle 110, the first remote vehicle 121, or both, may be equipped with internet access and share data with other devices both inside and outside the ego vehicle 110, the first remote vehicle 121, or both. The ego vehicle 110, the first remote vehicle 121, or both may communicate with the server 240 (shown in FIG. 2) and transmit its data to the server 240 (shown in FIG. 2). For example, the ego vehicle 110, the first remote vehicle 121, or both, transmits information about its current location and destination, its environment, information about a current driver, information about a task that it is currently implementing, and the like. The ego vehicle 110, the first remote vehicle 121, or both, may include an actuator configured to move the ego vehicle 110, the first remote vehicle 121, or both.

Referring to FIG. 1A, the first remote vehicle 121 is planning to merge from a ramp ahead of the ego vehicle 110. The ego vehicle 110 is approaching from an on-ramp. The first conflict zone 131 is defined near the end of the ramp, where the ego vehicle 110 and the first remote vehicle 121 should not appear inside at the same time to avoid undesired situation, such as collision.

The ego vehicle 110 obtains a maneuver message from the first remote vehicle 121. The maneuver message includes a negotiation request related to a maneuver to be performed by the first remote vehicle 121, such as a plan to merge from a ramp ahead of the ego vehicle 110.

Figure 1B:
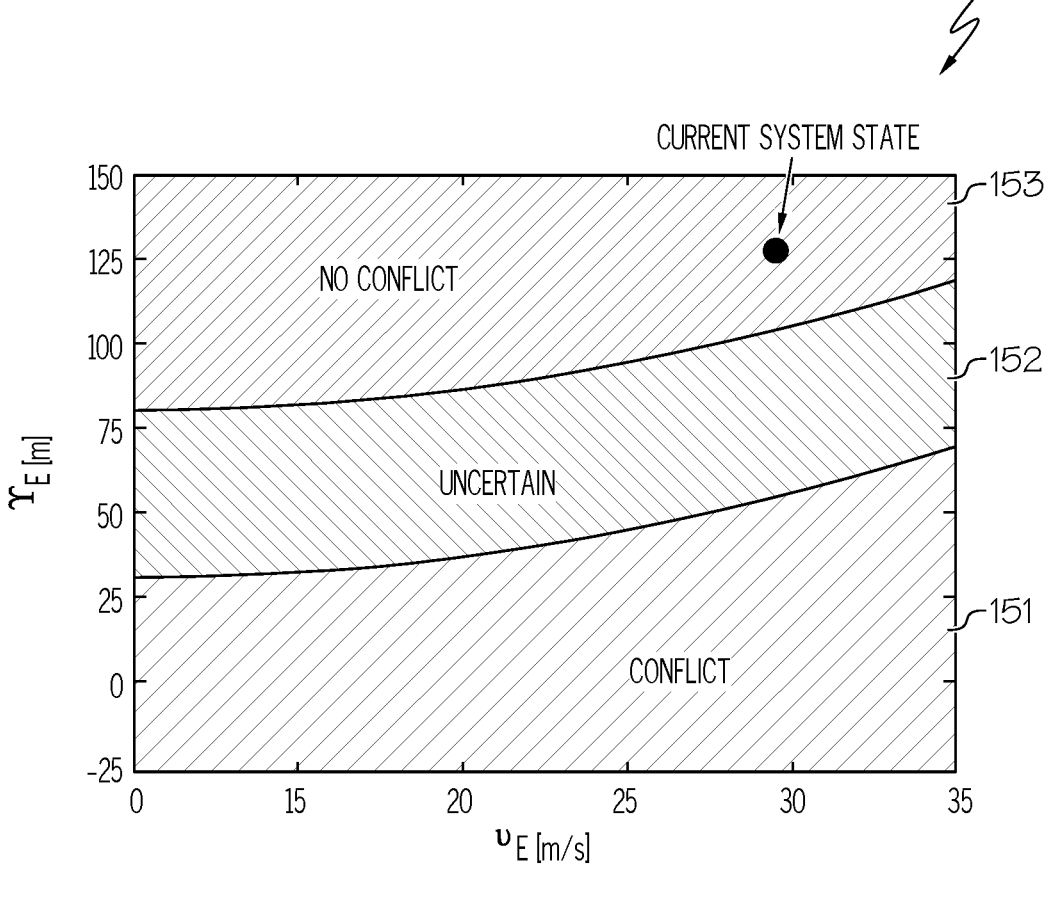

Referring to FIG. 1B, the ego vehicle 110 determines a degree of conflict in a first conflict zone 131. The ego vehicle 110 determines a degree of conflict in a first conflict zone 131 based on a position and a velocity of the ego vehicle 110, expected velocity/accelerations of the ego vehicle 110 for the following few seconds, and driving information of the first remote vehicle 121. The first remote vehicle 121 may be a negotiation requestor. The first remote vehicle 121 may transmit the driving information of the remote vehicle to the ego vehicle 110. The driving information of the first remote vehicle 121 may include the position of the first remote vehicle 121, the velocity of the first remote vehicle 121, the acceleration of the first remote vehicle 121, expected velocity/accelerations of the first remote vehicle 121 for the following few seconds, maneuver of the first remote vehicle 121, or combinations thereof.

The ego vehicle 110 may be a negotiation responder. The ego vehicle 110 may receive sensor data through one or more sensors 218 (shown in FIG. 2). The sensor data may include the information related to objects around the ego vehicle 110. For example, the sensor data may include boundaries of geometry, corners of geometry, boundaries of signs, corners of signs, boundaries of roadway, corners of roadway, boundaries of obstacles, corners of obstacles, or combinations thereof. The ego vehicle 110 may further receive Basic Safety Message, Maneuver Message, Sensor Data Message, or combinations thereof, from surrounding remote vehicles including the first remote vehicle 121.

The ego vehicle 110 may receive the driving information of the first remote vehicle 121 from the first remote vehicle 121, the server 240 (shown in FIG. 2), or both. The driving information of the first remote vehicle 121 may include the velocity of the first remote vehicle 121, the acceleration of the first remote vehicle 121, the position of the first remote vehicle 121, the direction that the first remote vehicle 121 is driving, the intended direction that the first remote vehicle 121 is driving within a predetermined time period, or combinations thereof. Based on the position and the velocity of the ego vehicle 110, expected velocity/accelerations of the ego vehicle 110 for the following few seconds, and driving information of the first remote vehicle 121, the ego vehicle 110 may generate a conflict chart 150 and determine the degree of conflict based on the position of the state of the ego vehicle 110 in the conflict chart 150.

The conflict chart 150 may comprise a no-conflict domain 153, an uncertain domain 152, and a conflict domain 151 as shown in FIG. 1B. The conflict domain 151 may be defined as a domain where there is greater than or equal to a first percentage (e.g., 90 percent (%)) of the possibility of conflict between the ego vehicle 110 and the first remote vehicle 121 when the first remote vehicle 121 performs the maneuver, such as platooning, merging, lane changing, intersection crossing simultaneously. In the conflict domain 151, the ego vehicle 110 cannot cooperate with the maneuver of the first remote vehicle 121 without causing conflict. The no-conflict domain 153 may be defined as a domain where there is less than or equal to a second percentage (e.g., 10%) of the possibility of conflict between the ego vehicle 110 and the first remote vehicle 121 when the first remote vehicle 121 performs the maneuver, such as platooning, merging, lane changing, intersection crossing simultaneously. In the no-conflict domain 153, little or no action of the ego vehicle 110, the first remote vehicle 121, or both, compared to the uncertain domain 152, is required to cooperate with the maneuver of the first remote vehicle 121. The uncertain domain 152 may be defined as a domain where there is a greater than the second percentage (e.g., 10%) and less than the first percentage (e.g., 90%) of the possibility of conflict between the ego vehicle 110 and the first remote vehicle 121 when the first remote vehicle 121 performs the maneuver, such as platooning, merging, lane changing, intersection crossing simultaneously. In the uncertain domain 152, significant action of the ego vehicle 110, the first remote vehicle 121, or both, compared to the no-conflict domain 153, is required to cooperate with the maneuver of the first remote vehicle 121. In the conflict chart 150, $r_E$ refers to the position of the ego vehicle 110, and $v_E$ refers to the velocity of the ego vehicle 110. The position of the ego vehicle 110 may refer to a distance, for example, the shortest distance, from the first conflict zone 131 to the ego vehicle 110.

Still referring to FIG. 1B, the ego vehicle 110 may determine the position of the state of the ego vehicle 110 is in the no conflict domain 151 based on the position and the velocity of the ego vehicle 110, and driving information of the first remote vehicle 121. The position of the state of the ego vehicle 110 in the no conflict domain 151 may indicate that a conflict between the ego vehicle 110 and the first remote vehicle 121 may not happen when the first remote vehicle 121 maintains the current driving information, such as, the lane, the velocity, or both and performs the maneuver.

Figures 1C, 1D:
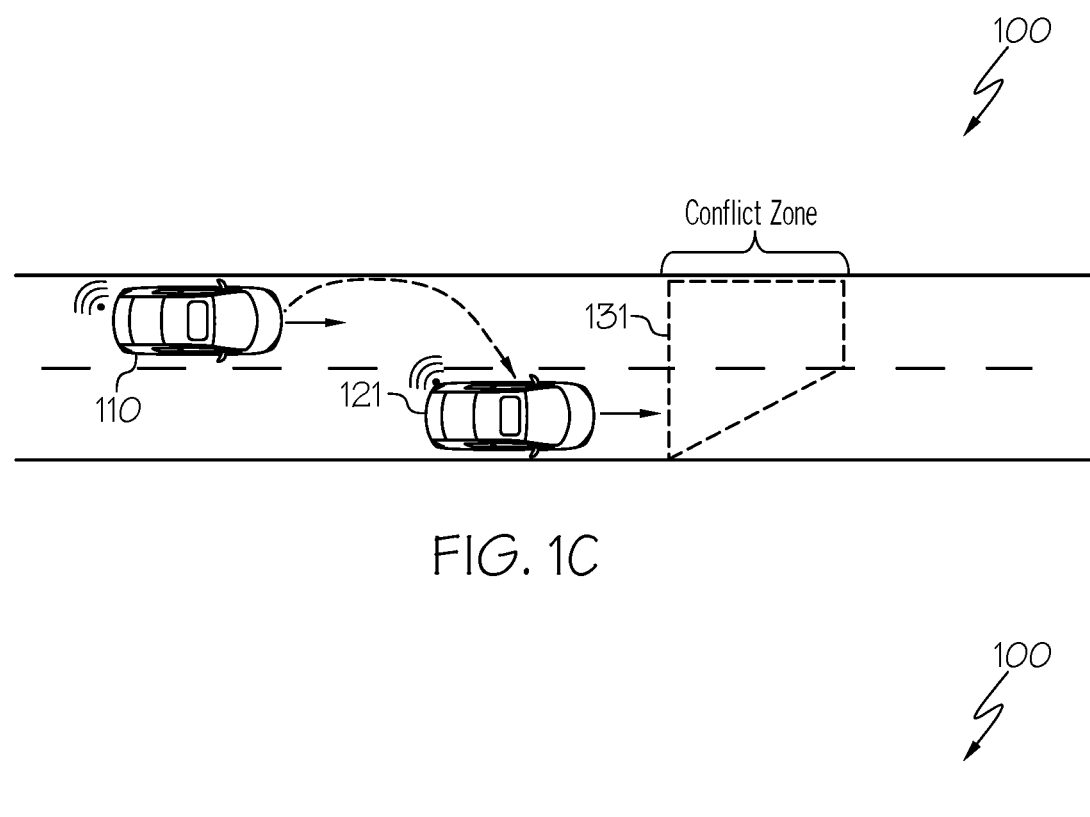

Referring to FIG. 1C, in response to determining that the position of the state of the ego vehicle 110 is in the no conflict domain 151, the ego vehicle 110 may accept the negotiation request based on the degree of conflict. The ego vehicle 110 may send the acceptance of the negotiation request to the first remote vehicle 121. In response to determining that the position of the state of the ego vehicle 110 is in the no conflict domain 151, the ego vehicle 110 may accept the negotiation request without sending an alternative suggestion to the first remote vehicle 121.

Referring to FIG. 1D, in response to determining that the position of the state of the ego vehicle 110 is in the no conflict domain 151, the ego vehicle 110 may drive based on the accepted negotiation request. The first remote vehicle 121 may merge ahead of the ego vehicle 110 without an undesired situation. The first remote vehicle 121 may merge ahead of the ego vehicle 110, while the ego vehicle 110 keeps driving in the same lane and without significantly changing the velocity, the acceleration, or the direction, or combinations thereof. Different ways of responding to the negotiation request including an alternative suggestion in different scenarios will be described below with reference to FIGS. 3A through 5B.

Figure 2:
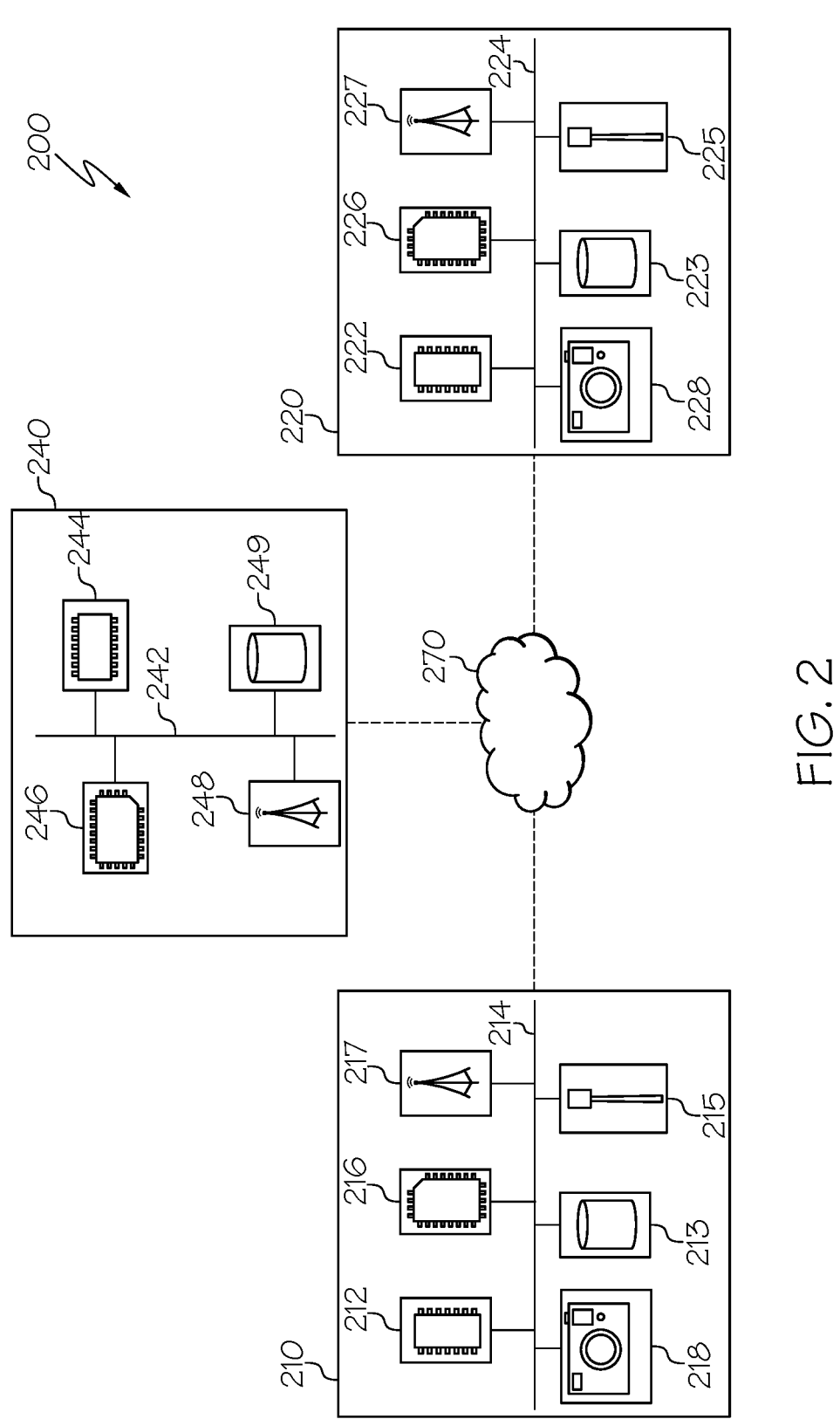
FIG. 2 depicts a schematic diagram of a system for responding to a request for a negotiation, according to one or more embodiments shown and described herein.

FIG. 2 depicts a schematic diagram of a system for responding to a request for a negotiation, according to one or more embodiments shown and described herein.

Referring to FIG. 2, the system 200 includes an ego vehicle system 210, a remote vehicle system 220, and the server 240.

The ego vehicle system 210 includes one or more processors 212. Each of the one or more processors 212 may be any device capable of executing machine-readable and executable instructions. Each of the one or more processors 212 may be a controller, an integrated circuit, a microchip, a computer, or any other computing device. One or more processors 212 are coupled to a communication path 214 that provides signal interconnectivity between various modules of the system. The communication path 214 may communicatively couple any number of processors 212 with one another, and allow the modules coupled to the communication path 214 to operate in a distributed computing environment. Each of the modules may operate as a node that may send and/or receive data. As used herein, the term "communicatively coupled" means that coupled components are capable of exchanging data signals with one another such as electrical signals via a conductive medium, electromagnetic signals via air, optical signals via optical waveguides, and the like.

The communication path 214 may be formed from any medium that is capable of transmitting a signal such as conductive wires, conductive traces, optical waveguides, or the like. In some embodiments, the communication path 214 may facilitate the transmission of wireless signals, such as WiFi, Bluetooth®, Near Field Communication (NFC), and the like. The communication path 214 may be formed from a combination of mediums capable of transmitting signals. In one embodiment, the communication path 214 comprises a combination of conductive traces, conductive wires, connectors, and buses that cooperate to permit the transmission of electrical data signals to components such as processors, memories, sensors, input devices, output devices, and communication devices. The communication path 214 may comprise a vehicle bus, such as a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The ego vehicle system 210 includes one or more memory modules 216 coupled to the communication path 214 and may contain non-transitory computer-readable medium comprising RAM, ROM, flash memories, hard drives, or any device capable of storing machine-readable and executable instructions such that the machine-readable and executable instructions can be accessed by the one or more processors 212. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored in the one or more memory modules 216. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 212 along with the one or more memory modules 216 may operate as a controller for the ego vehicle system 210.

The one or more memory modules 216 store instructions, when executed by the one or more processors 212, that cause the one or more processors 212 to obtain a maneuver message from the first remote vehicle 121 (shown in FIG. 1A), which includes a negotiation request related to a maneuver to be performed by the first remote vehicle 121 (shown in FIG. 1A), determine a degree of conflict based on the position and the velocity of the ego vehicle 110 (shown in FIG. 1A), and driving information of the first remote vehicle 121 (shown in FIG. 1A), determine whether to accept the negotiation request based on the degree of conflict, send a maneuver message including an alternative suggestion to the first remote vehicle 121 (shown in FIG.

1A) in response to determining to reject the negotiation request, and control the ego vehicle 110 (shown in FIG. 1A) based on a negotiation result.

Still referring to FIG. 2, the ego vehicle system 210 includes one or more sensors 218. One or more sensors 218 may be any device having an array of sensing devices capable of detecting radiation in an ultraviolet wavelength band, a visible light wavelength band, or an infrared wavelength band. One or more sensors 218 may detect the presence of the ego vehicle system 210, the presence of the remote vehicle system 220, the location of the ego vehicle system 210, the location of the remote vehicle system 220, the distance between the ego vehicle system 210 and the remote vehicle system 220. One or more sensors 218 may have any resolution. In some embodiments, one or more optical components, such as a mirror, fish-eye lens, or any other type of lens may be optically coupled to one or more sensors 218. In some embodiments, one or more sensors 218 may provide image data to one or more processors 212 or another component communicatively coupled to the communication path 214. In some embodiments, one or more sensors 218 may provide navigation support. In embodiments, data captured by one or more sensors 218 may be used to autonomously or semi-autonomously navigate the ego vehicle system 210.

The ego vehicle system 210 includes a satellite antenna 215 coupled to the communication path 214 such that the communication path 214 communicatively couples the satellite antenna 215 to other modules of the ego vehicle system 210. The satellite antenna 215 is configured to receive signals from global positioning system satellites. In one embodiment, the satellite antenna 215 includes one or more conductive elements that interact with electromagnetic signals transmitted by global positioning system satellites. The received signal is transformed into a data signal indicative of the location (e.g., latitude and longitude) of the satellite antenna 215 or an object positioned near the satellite antenna 215, by one or more processors 212.

The ego vehicle system 210 includes one or more vehicle sensors 213. Each of one or more vehicle sensors 213 is coupled to the communication path 214 and communicatively coupled to one or more processors 212. One or more vehicle sensors 213 may include one or more motion sensors for detecting and measuring motion and changes in the motion of the ego vehicle system 210. The motion sensors may include inertial measurement units. Each of the one or more motion sensors may include one or more accelerometers and one or more gyroscopes. Each of one or more motion sensors transforms sensed physical movement of the vehicle into a signal indicative of an orientation, a rotation, a velocity, or an acceleration of the vehicle.

Still referring to FIG. 2, the ego vehicle system 210 includes a network interface hardware 217 for communicatively coupling the ego vehicle system 210 to the server 240. The network interface hardware 217 may be communicatively coupled to the communication path 214 and may be any device capable of transmitting and/or receiving data via a network. The network interface hardware 217 may include a communication transceiver for sending and/or receiving any wired or wireless communication. For example, the network interface hardware 217 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 217 includes hardware configured to operate in accordance with the Bluetooth® wireless communication protocol. The network interface hardware 217 of the ego vehicle system 210 may transmit its data to the server 240. For example, the network interface hardware 217 of the ego vehicle system 210 may transmit vehicle data, location data, maneuver data, and the like to the server 240.

The ego vehicle system 210 may connect with one or more external ego vehicle systems (e.g., the remote vehicle system 220) and/or external processing devices (e.g., a cloud server, an edge server, or both) via a direct connection. The direct connection may be a vehicle-to-vehicle connection ("V2V connection"), a vehicle-to-everything connection ("V2X connection"), or an mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure.

Vehicles may function as infrastructure nodes to form a mesh network and connect dynamically on an ad-hoc basis. In this way, vehicles may enter and/or leave the network at will, such that the mesh network may self-organize and self-modify over time. The network may include vehicles forming peer-to-peer networks with other vehicles or utilizing centralized networks that rely upon certain vehicles and/or infrastructure elements. The network may include networks using the centralized server and other central computing devices to store and/or relay information between vehicles.

Still referring to FIG. 2, the ego vehicle system 210 may be communicatively coupled to the remote vehicle system 220, the server 240, or both, by the network 270. In one embodiment, the network 270 may include one or more computer networks (e.g., a personal area network, a local area network, or a wide area network), cellular networks, satellite networks and/or a global positioning system and combinations thereof. The ego vehicle system 210 may be communicatively coupled to the network 270 via a wide area network, a local area network, a personal area network, a cellular network, a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the remote vehicle system 220 includes one or more processors 222, one or more memory modules 226, one or more sensors 228, one or more device sensors 223, a satellite antenna 225, a network interface hardware 227, and a communication path 224 communicatively connected to the other components of remote vehicle system 220. The components of the remote vehicle system 220 may be structurally similar to and have similar functions as the corresponding components of the ego vehicle system 210 (e.g., the one or more processors 222 correspond to the one or more processors 212, the one or more memory modules 226 correspond to the one or more memory modules 216, the one or more sensors 228 correspond to the one or more sensors 218, the satellite antenna 225 corresponds to the satellite antenna 215, the communication path 224 corresponds to the communication path 214, and the network interface hardware 227 corresponds to the network interface hardware 217).

Still referring to FIG. 2, the server 240 includes one or more processors 244, one or more memory modules 246, a network interface hardware 248, one or more vehicle sensors 249, and a communication path 242 communicatively connected to the other components of the ego vehicle system 210. The components of the server 240 may be structurally similar to and have similar functions as the corresponding components of the ego vehicle system 210 (e.g., the one or more processors 244 correspond to the one or more processors 212, the one or more memory modules 246 correspond to the one or more memory modules 216, the one or more vehicle sensors 249 correspond to the one or more vehicle sensors 213, the communication path 242 corresponds to the communication path 214, and the network interface hardware 248 corresponds to the network interface hardware 217). The one or more memory modules 246 store instructions, when executed by the one or more processors 244, that cause the one or more processors 244 to determine a degree of conflict based on the position and the velocity of the ego vehicle 110 (shown in FIG. 1A), and driving information of the first remote vehicle 121 (shown in FIG. 1A), determine whether to accept the negotiation request based on the degree of conflict, and transmit a maneuver message including an alternative suggestion to the first remote vehicle 121 (shown in FIG. 1A) in response to determining to reject the negotiation request.

It should be understood that the components illustrated in FIG. 2 are merely illustrative and are not intended to limit the scope of this disclosure. More specifically, while the components in FIG. 2 are illustrated as residing within the ego vehicle system 210 the remote vehicle system 220, or both, this is a non-limiting example. In some embodiments, one or more of the components may reside external to the ego vehicle system 210, the remote vehicle system 220, or both, such as with the server 240.

FIGS. 3A-3F schematically depict an exemplary embodiment of responding to a request for a negotiation including lane exchanges on a road, according to one or more embodiments shown and described herein.

Figure 3A:
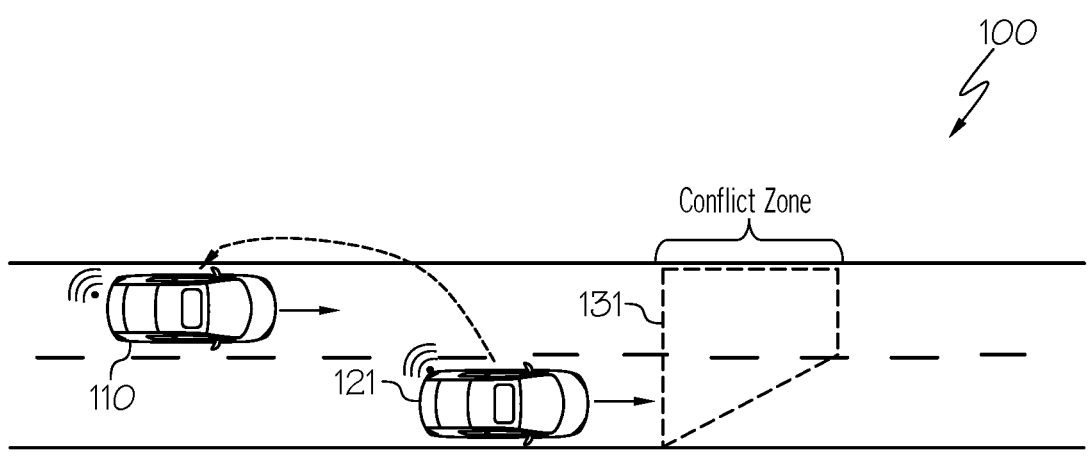
FIGS. 3A-3F schematically depict an exemplary embodiment of responding to a request for a negotiation including lane exchanges on a road, according to one or more embodiments shown and described herein.

Referring to FIG. 3A, the ego vehicle 110 and the first remote vehicle 121 may be on a road similar to FIG. 1A but the ego vehicle 110 has a closer initial position to the first conflict zone 131 than in FIG. 1A. The velocity, the acceleration, or both of the ego vehicle 110 in FIG. 3A are higher than those of the ego vehicle 110 in FIG. 1A. These driving information of the ego vehicle 110, the location of the ego vehicle 110, and the location of the first remote vehicle 121 may make it harder for the ego vehicle 110 to allow the first remote vehicle 121 to merge ahead of the ego vehicle 110 without a conflict, compared to FIG. 1A.

Still referring to FIG. 3A, the first remote vehicle 121 is planning to merge from a ramp ahead of the ego vehicle 110. The ego vehicle 110 is approaching from an on-ramp. The first conflict zone 131 is defined near the end of the ramp, where the ego vehicle 110 and the first remote vehicle 121 should not appear inside at the same time to avoid undesired situation, such as collision.

The ego vehicle 110 obtains a maneuver message from the first remote vehicle 121. The maneuver message includes a negotiation request related to a maneuver to be performed by the first remote vehicle 121, such as a plan to merge from a ramp ahead of the ego vehicle 110.

Figure 3B:
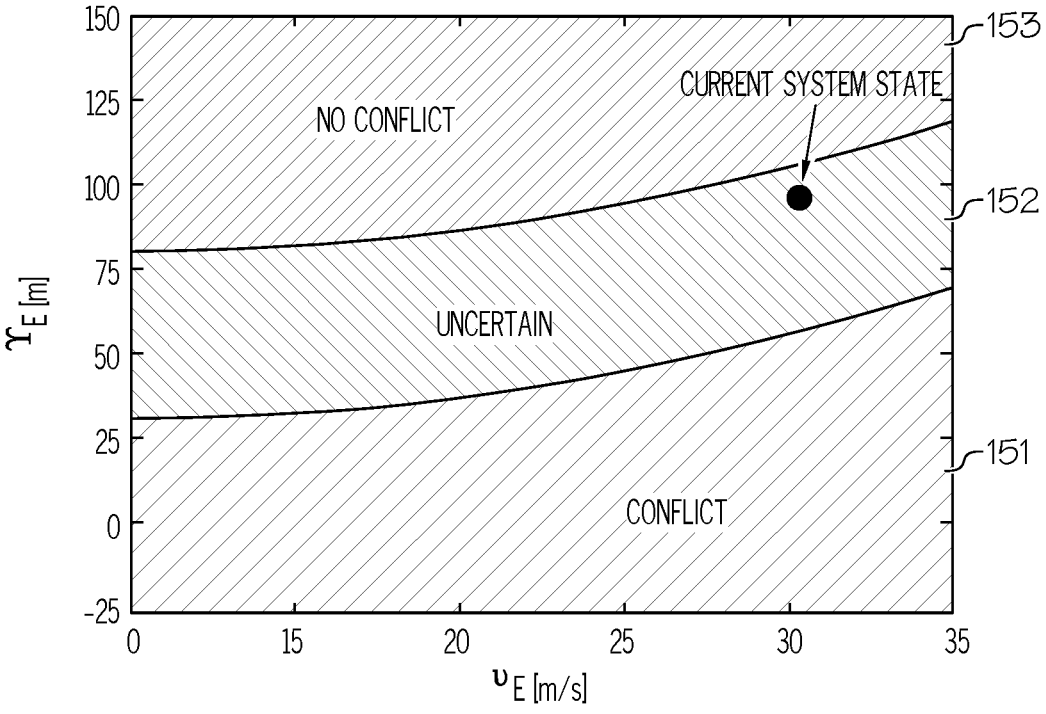

Referring to FIG. 3B, the ego vehicle 110 determines a degree of conflict in the first conflict zone 131 based on the position and the velocity of the ego vehicle 110, expected velocity/accelerations of the ego vehicle 110 for the following few seconds and driving information of the first remote vehicle 121. The ego vehicle 110 may determine the position of the state of the ego vehicle 110 is in the uncertain domain 152.

Figure 3C:
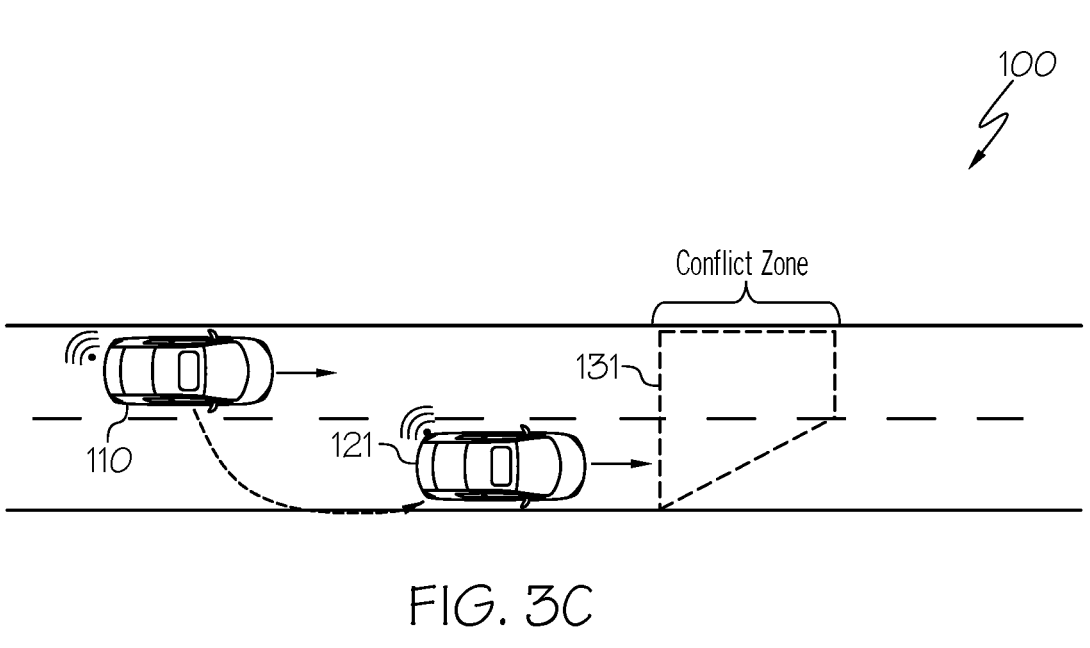

Referring to FIG. 3C, in response to determining that the position of the state of the ego vehicle 110 is in the uncertain domain 152, the ego vehicle 110 may reject the negotiation request from the first remote vehicle 121. In response to determining that the position of the state of the ego vehicle 110 is in the uncertain domain 152, the ego vehicle 110 may generate an alternative suggestion for suggested maneuver of the first remote vehicle 121 to the first remote vehicle 121.

Figure 3D:
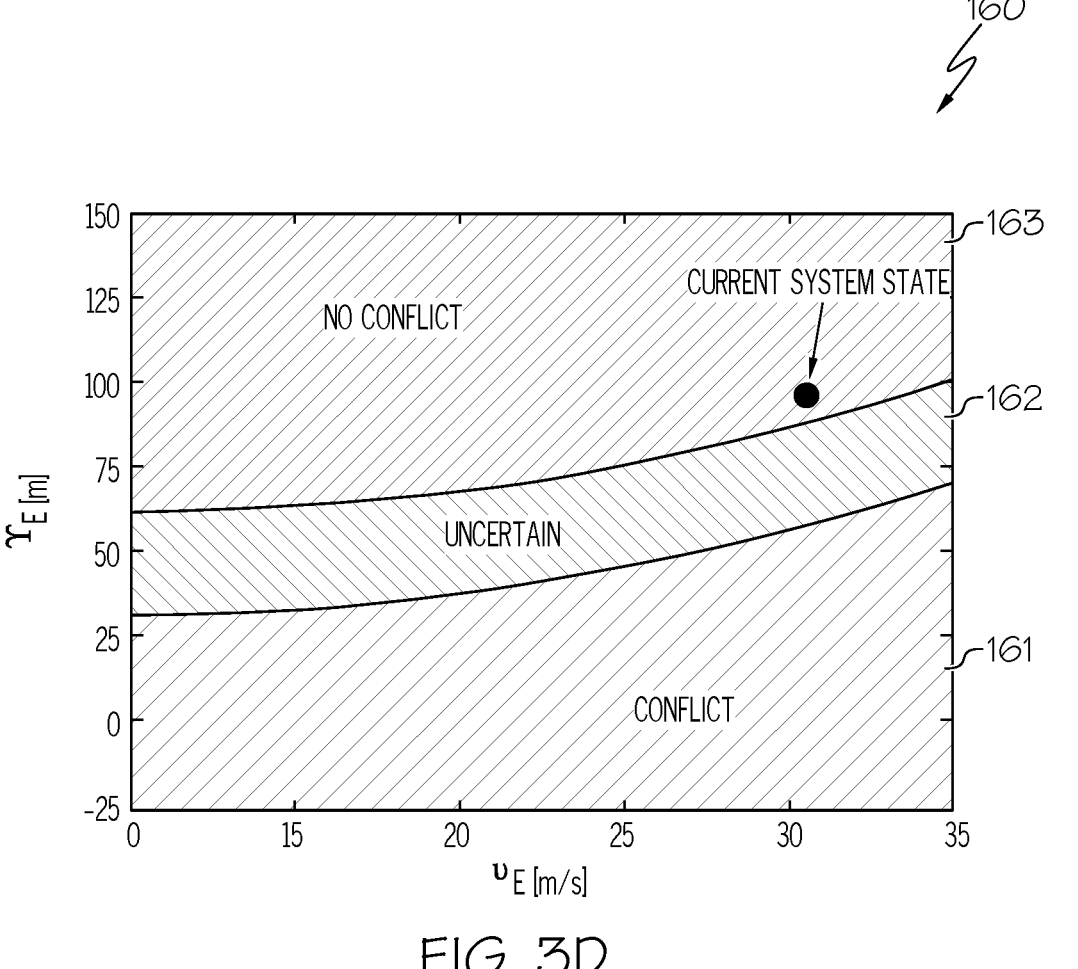

Referring to FIG. 3D, in response to determining that the position of the state of the ego vehicle 110 is in the uncertain domain 152, the ego vehicle 110 may generate the alternative suggestion for suggested maneuver of the first remote vehicle 121 such that a position of an alternative state of the ego vehicle 110 in a new conflict chart 160 generated based on the suggested maneuver of the first remote vehicle 121 is in the no-conflict domain 163. Similar to the conflict chart 150 shown in FIG. 3B, the new conflict chart 160 comprise a no-conflict domain 163, an uncertain domain 162, and a conflict domain 161. The ego vehicle 110 may generate the new conflict chart 160 based on the position and the velocity of the ego vehicle 110, expected velocity/accelerations of the ego vehicle 110 for the following few seconds and driving information of the first remote vehicle 121 including the suggested maneuver of the first remote vehicle 121. The position of the alternative state of the ego vehicle 110 in the no-conflict domain 163 may indicates that, under the alternative suggestion, the first remote vehicle 121 may still merge ahead of the ego vehicle 110 without a conflict.

Figure 3E:
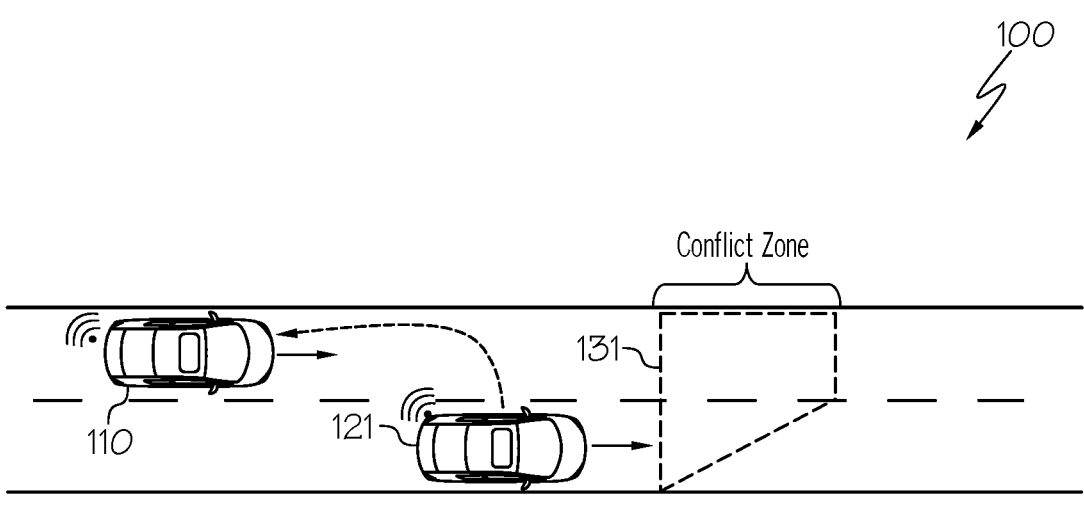

Referring to FIG. 3E, the ego vehicle 110 may send a maneuver message including the alternative suggestion to the first remote vehicle 121 in response to determining to reject the negotiation request. The first remote vehicle 121 may accept the alternative suggestion from the ego vehicle 110. The ego vehicle 110 may receive the acceptance of the alternative suggestion from the first remote vehicle 121.

Figure 3F:
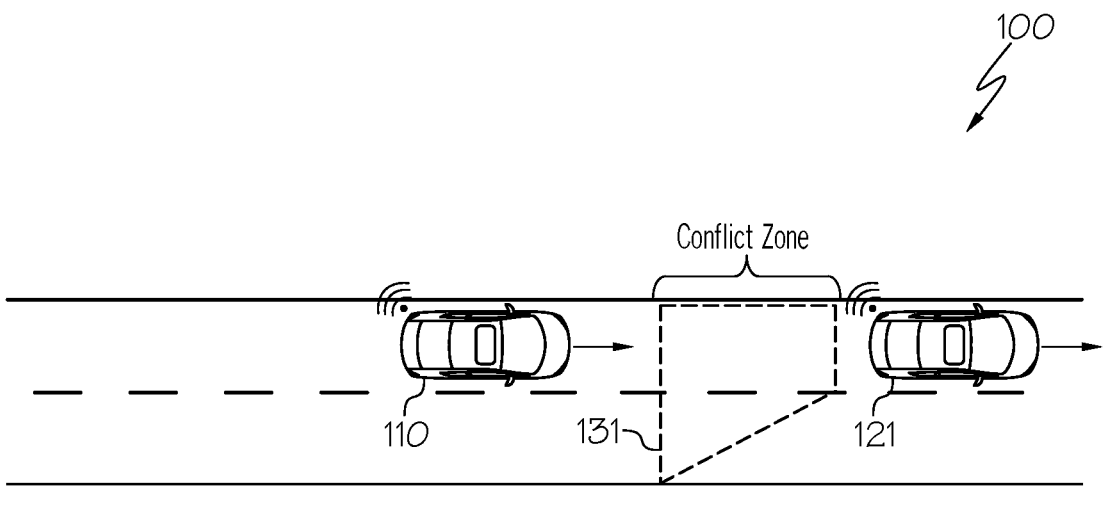

Referring to FIG. 3F, in response to receiving the acceptance of the alternative suggestion from the first remote vehicle 121, the ego vehicle 110 drives based on a negotiation result, such as the alternative suggestion. The first remote vehicle 121 may merge ahead of the ego vehicle 110 without an undesired situation. With the alternative suggestion, the first remote vehicle 121 may merge ahead of the ego vehicle 110, while the ego vehicle 110 keeps driving in the same lane and without significantly changing the velocity, the acceleration, or the direction, or combinations thereof.

FIGS. 4A-4H schematically depict an exemplary embodiment of responding to a request for a negotiation including lane exchanges on a road, according to one or more embodiments shown and described herein.

Figure 4A:
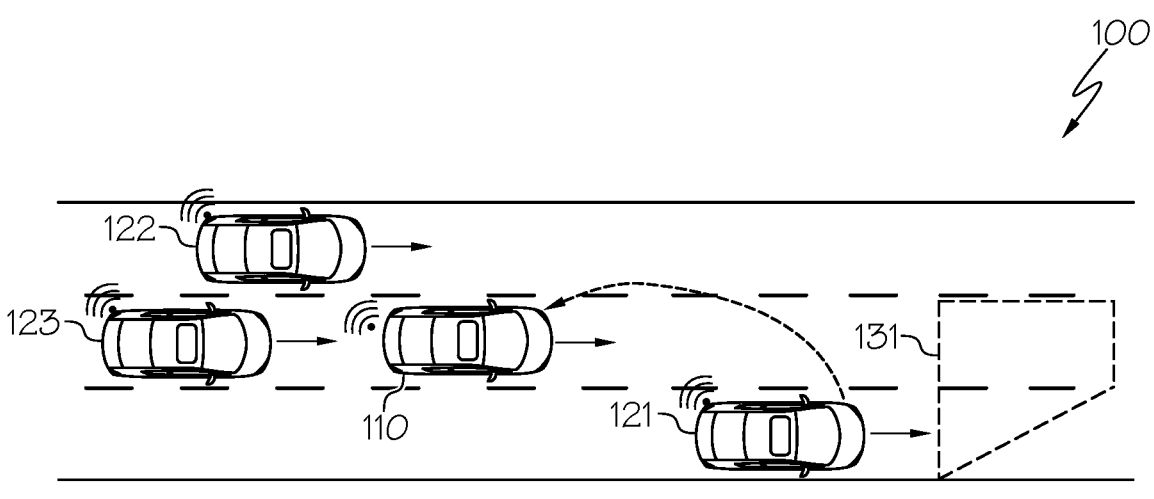
FIGS. 4A-4H schematically depict an exemplary embodiment of responding to a request for a negotiation including lane exchanges on a road, according to one or more embodiments shown and described herein.

Referring to FIG. 4A, the ego vehicle 110 may be connected with a plurality of remote vehicles. The plurality of remote vehicles include the first remote vehicle 121, the second remote vehicle 122, and the third remote vehicle 123. The ego vehicle 110 and the first remote vehicle 121 may be on a road similar to FIG. 3A but the ego vehicle 110 and the first remote vehicle 121 has a closer initial position to the first conflict zone 131 than in FIG. 3A. The velocity, the acceleration, or both of the ego vehicle 110 in FIG. 3A are higher than those of the ego vehicle 110 in FIG. 3A. FIG. 4A shows a dense traffic scenario where surrounding second remote vehicle 122 and third remote vehicle 123 exist. These driving information from the first remote vehicle 121, the second remote vehicle 122, and the third remote vehicle 123, the location of the ego vehicle 110, and the locations of the first remote vehicle 121, the second remote vehicle 122, and the third remote vehicle 123 may make it harder for the ego vehicle 110 to make space for the first remote vehicle 121 to merge ahead without a conflict, compared to FIG. 3A.

Still referring to FIG. 4A, the first remote vehicle 121 is planning to merge from a ramp ahead of the ego vehicle 110. The first remote vehicle 121 is in the rightmost lane. The ego vehicle 110 is approaching from an on-ramp. The third remote vehicle 123 is behind of the ego vehicle 110. The ego vehicle 110 and the third remote vehicle 123 are in the middle lane. The second remote vehicle 122 is in the leftmost lane. The first conflict zone 131 is defined near the end of the ramp, where the ego vehicle 110 and the first remote vehicle 121 should not appear inside at the same time to avoid undesired situation, such as collision. The ego vehicle 110 may determine that the second remote vehicle 122 and the third remote vehicle 123 are vehicles with SAE level 3 or more autonomy.

The ego vehicle 110 obtains a maneuver message from the first remote vehicle 121. The maneuver message includes a negotiation request related to a maneuver to be performed by the first remote vehicle 121, such as a plan to merge from a ramp ahead of the ego vehicle 110.

Figure 4B:
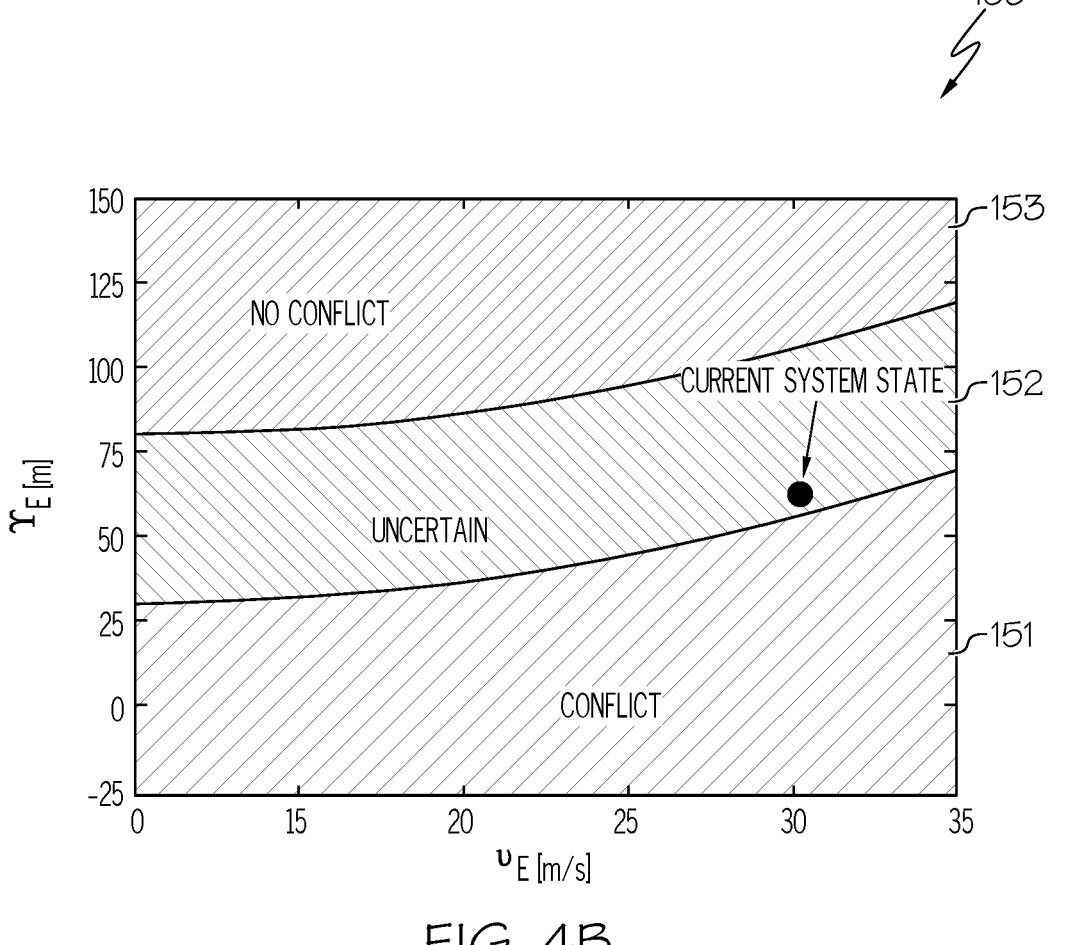

Referring to FIG. 4B, the ego vehicle 110 determines a degree of conflict in a first conflict zone 131 based on the position and the velocity of the ego vehicle 110, expected velocity/accelerations of the ego vehicle 110 for the following few seconds and driving information of the first remote vehicle 121. The ego vehicle 110 may determine the position of the state of the ego vehicle 110 is in the uncertain domain 152. Compared to FIG. 3B, the position of the state of the ego vehicle 110 is closer to the conflict domain 151. Based on the position of the state of the ego vehicle 110, the ego vehicle 110 may determine that accepting the negotiation request from the first remote vehicle 121 may likely cause a conflict. The ego vehicle 110 may determine that it is hard to find an alternative suggestion that is directed to maneuver of the ego vehicle 110 and the first remote vehicle 121 only and that does not result in conflict. Because the second remote vehicle 122 and the third remote vehicle 123 are nearby, the ego vehicle 110 may determine that the ego vehicle 110 needs to check conflict with the second remote vehicle 122 and the third remote vehicle 123.

Figures 4C, 4D, 4E:
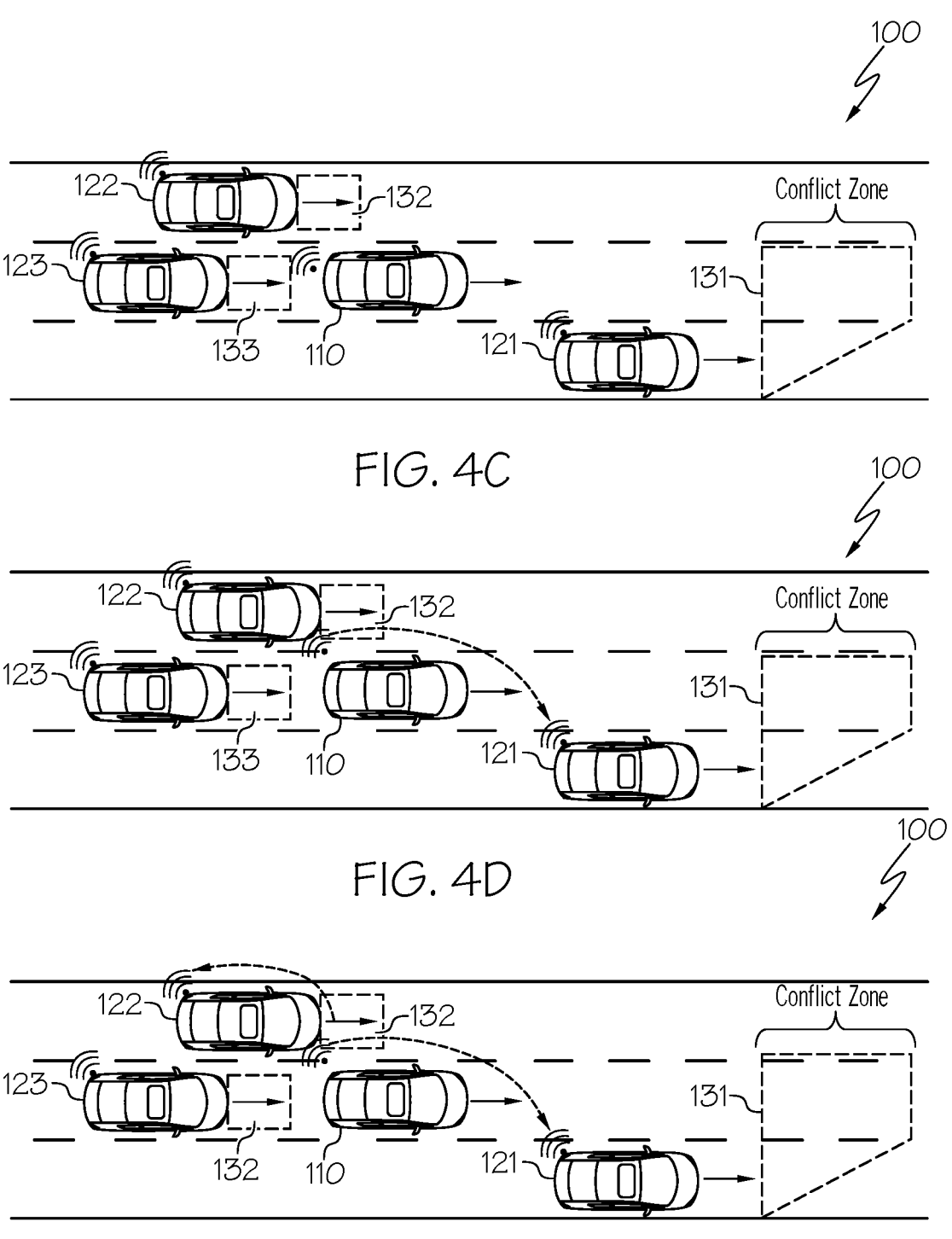

Referring to FIG. 4C, the ego vehicle 110 may determine whether to accept the negotiation request from the first remote vehicle 121. The ego vehicle 110 may determine whether accepting the negotiation request from the first remote vehicle 121 results in a conflict between the ego vehicle 110 and the second remote vehicle 122. The ego vehicle 110 may determine whether accepting the negotiation request from the first remote vehicle 121 results in a conflict between the ego vehicle 110 and the third remote vehicle 123. The ego vehicle 110 may determine that if the ego vehicle 110 accepts the negotiation request from the first remote vehicle 121, there might be a conflict with either the second remote vehicle 122 in the second conflict zone 132 or the third remote vehicle 123 in the third conflict zone 133. The second conflict zone 132 is defined a zone where the ego vehicle 110 and the second remote vehicle 122 should not appear inside at the same time to avoid undesired situation, such as collision. The third conflict zone 133 is defined a zone where the ego vehicle 110 and the third remote vehicle 123 should not appear inside at the same time to avoid undesired situation, such as collision. For example, the ego vehicle 110 may determine that there might be a conflict with the second remote vehicle 122 in the second conflict zone when the ego vehicle 110 is required to make a space for the first remote vehicle 121 by making a lane change to the left. The ego vehicle 110 may determine that there might be a conflict with the third remote vehicle 123 in the third conflict zone 133 when the ego vehicle 110 is required to make a space for the first remote vehicle 121 by slowing down.

Referring to FIG. 4D, in response to determining that accepting the negotiation request results in the conflict between the ego vehicle 110 and the second remote vehicle 122 or the conflict between the ego vehicle 110 and the third remote vehicle 123, the ego vehicle 110 may reject the negotiation request from the first remote vehicle 121. In response to determining that accepting the negotiation request does not result in the conflict between the ego vehicle 110 and the second remote vehicle 122 or the conflict between the ego vehicle 110 and the third remote vehicle 123, the ego vehicle 110 may accept the negotiation request from the first remote vehicle 121.

Referring to FIG. 4E, in response to determining that accepting the negotiation request results in the conflict between the ego vehicle 110 and the second remote vehicle 122 or the conflict between the ego vehicle 110 and the third remote vehicle 123, the ego vehicle 110 may send the alternative first suggestion to the first remote vehicle 121. In the alternative first suggestion, the ego vehicle 110 may make a room for the first remote vehicle 121 to make a lane change to the left. In response to determining that accepting the negotiation request from the first remote vehicle 121 results in a conflict between the ego vehicle 110 and the second remote vehicle 122, the ego vehicle 110 may send the alternative second suggestion to the second remote vehicle 122. The alternative second suggestion has the second remote vehicle 122 slow down to give room for the ego vehicle 110 to make a lane change to the left, which in turn would allow the first remote vehicle 121 to change lanes to the left. In embodiments, in response to determining that accepting the negotiation request from the first remote vehicle 121 does not result in a conflict between the ego vehicle 110 and the third remote vehicle 123, the ego vehicle 110 does not need to send any cooperation request to the third remote vehicle 123. The third remote vehicle 123 may drive in a same manner. In other embodiments, after the ego vehicle 110 rejects the negotiation request from the first remote vehicle 121, the ego vehicle 110 may send an alternative third suggestion to the third remote vehicle 123. The alternative third suggestion has the third remote vehicle 123 will slow down.

Figures 4F, 4G, 4H:
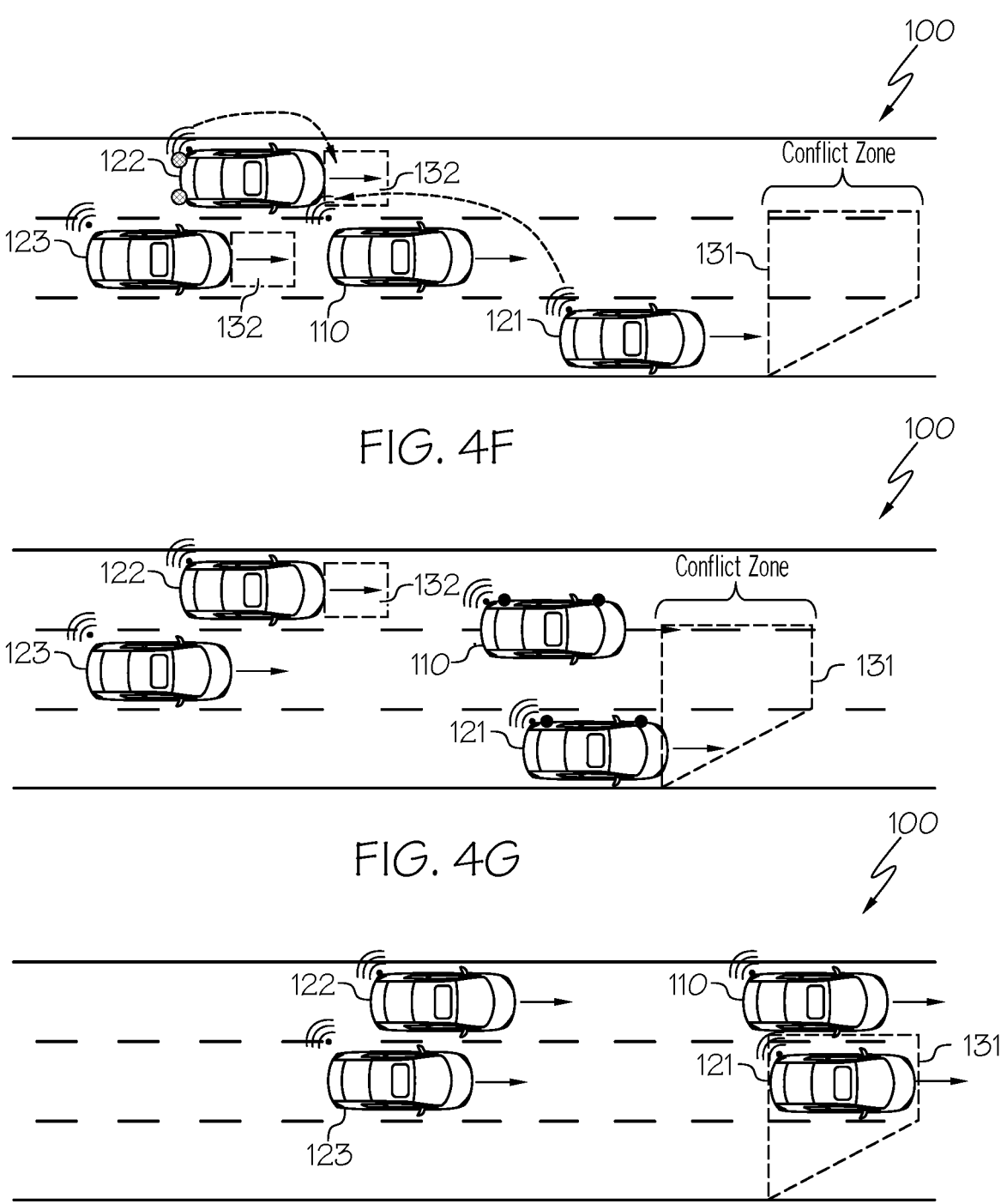

Referring to FIG. 4F, the first remote vehicle 121 may accept the alternative first suggestion from the ego vehicle 110. The ego vehicle 110 may receive the acceptance of the alternative first suggestion from the first remote vehicle 121. The second remote vehicle 122 may accept the alternative second suggestion from the ego vehicle 110. The ego vehicle 110 may receive the acceptance of the alternative second suggestion from the second remote vehicle 122. In embodiments, the third remote vehicle 123 may accept the alternative third suggestion from the ego vehicle 110. The ego vehicle 110 may receive the acceptance of the alternative third suggestion from the third remote vehicle 123.

Referring to FIGS. 4G and 4H, in response to receiving the acceptance of the alternative first suggestion from the first remote vehicle 121 and the acceptance of the alternative second suggestion from the second remote vehicle 122, the ego vehicle 110 may drive based on result of negotiation, such as the accepted alternative first suggestion and the accepted alternative second suggestion. For example, referring to FIGS. 4G, the second remote vehicle 122 may slow down to make a room for the ego vehicle 110 to change into the leftmost lane. At the same time, the ego vehicle 110 may make a room for the first remote vehicle 121 to make a lane change to the left. Referring to FIGS. 4H, the ego vehicle 110 may change into the leftmost lane and the first remote vehicle 121 may change into the middle lane without an undesired situation, such as collision. In embodiments, in response to accepting the negotiation request from the first remote vehicle 121, the ego vehicle 110 may drive based on result of negotiation, such as the accepted negotiation request.

Figure 5A:
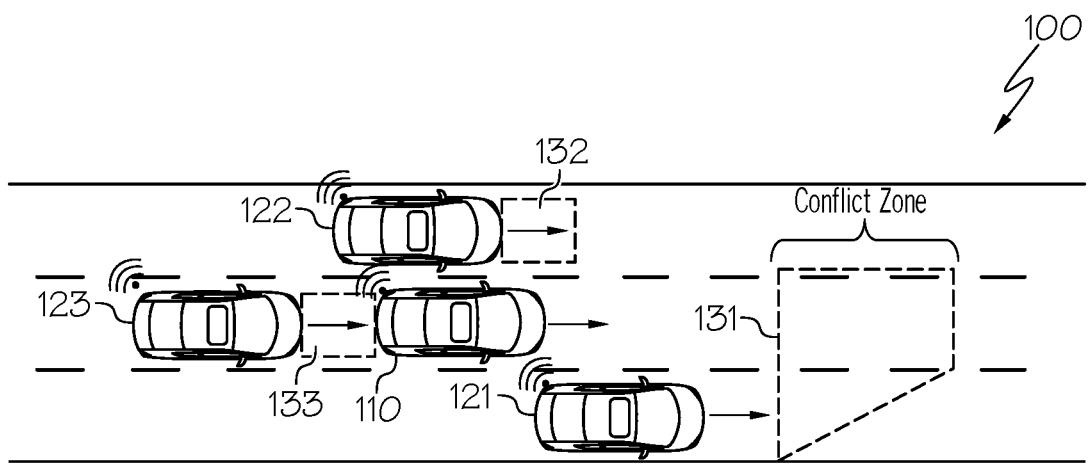
FIGS. 5A-5B schematically depict an exemplary embodiment of responding to a request for a negotiation including lane exchanges on a road, according to one or more embodiments shown and described herein.
Figure 5B:
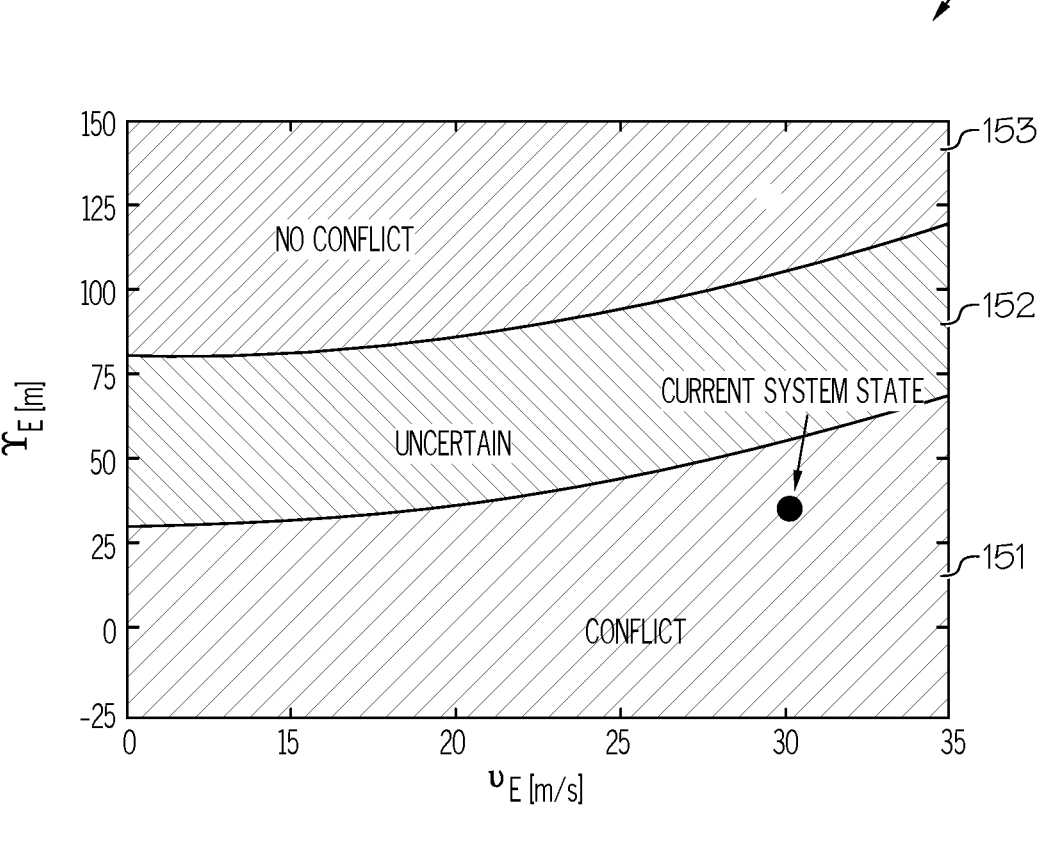

FIGS. 5A-5B schematically depict an exemplary embodiment of responding a request for a negotiation including lane exchanges on a road, according to one or more embodiments shown and described herein.

Referring to FIG. 5A, the ego vehicle 110, the first remote vehicle 121, the second remote vehicle 122, and the third remote vehicle 123 may be on a road similar to FIG. 4A but the ego vehicle 110, the first remote vehicle 121, the second remote vehicle 122, and the third remote vehicle 123 are significantly closer to the first conflict zone 131 than in FIG. 4A. The first remote vehicle 121 in FIG. 5A has an intention of driving similar to FIG. 4A. These driving information from the first remote vehicle 121, the location of the ego vehicle 110, and the location of the first remote vehicle 121 may make it harder for the ego vehicle 110 to merge ahead of the first remote vehicle 121 without a conflict, compared to FIG. 4A. These driving information from the first remote vehicle 121, the second remote vehicle 122, and the third remote vehicle 123, the location of the ego vehicle 110, and the location of the first remote vehicle 121, the second remote vehicle 122, and the third remote vehicle 123 may make it harder for the ego vehicle 110 to make space for the first remote vehicle 121 to merge ahead without a conflict, compared to FIG. 4A.

Still referring to FIG. 5A, the first remote vehicle 121 is planning to merge from a ramp ahead of the ego vehicle 110. The first remote vehicle 121 is in the rightmost lane. The ego vehicle 110 is approaching from an on-ramp. The third remote vehicle 123 is behind of the ego vehicle 110. The ego vehicle 110 and the third remote vehicle 123 are in the middle lane. The second remote vehicle 122 is in the leftmost lane. The first conflict zone 131 is defined near the end of the ramp, where the ego vehicle 110 and the first remote vehicle 121 should not appear inside at the same time to avoid undesired situation, such as collision. The ego vehicle 110 may determine that the second remote vehicle 122 and the third remote vehicle 123 are vehicles with SAE level 3 or more autonomy.

The ego vehicle 110 obtains a maneuver message from the first remote vehicle 121. The maneuver message includes a negotiation request related to a maneuver to be performed by the first remote vehicle 121, such as a plan to merge from a ramp ahead of the ego vehicle 110.

Referring to FIG. 5B, the ego vehicle 110 determines a degree of conflict in a first conflict zone 131 based on the position and the velocity of the ego vehicle 110, expected velocity/accelerations of the ego vehicle 110 for the following few seconds and driving information of the first remote vehicle 121. The ego vehicle 110 may determine the position of the state of the ego vehicle 110 is in the conflict domain 151. Based on the position of the state of the ego vehicle 110, the ego vehicle 110 may determine that accepting the negotiation request from the first remote vehicle 121 may result in the conflict between the ego vehicle 110 and the second remote vehicle 122 or the conflict between the ego vehicle 110 and the third remote vehicle 123. The ego vehicle 110 determines that the conflict between the ego vehicle 110 and the second remote vehicle 122 in the second conflict zone 132 or the conflict between the ego vehicle 110 and the third remote vehicle 123 in the third conflict zone 133 is unavoidable. In response to determining the position of the state of the ego vehicle 110 in the conflict domain 151, the ego vehicle 110 may reject the negotiation request from the first remote vehicle 121.

Referring to FIGS. 5A-5B, the ego vehicle 110 may determine that the second remote vehicle 122 and the third remote vehicle 123 are too close to the ego vehicle 110 while travelling with high speed. In response to determining that the position of the state of the ego vehicle 110 is in the conflict domain 151 in the conflict chart 150, the ego vehicle 110 may reject the negotiation request without sending an alternative suggestion to the first remote vehicle 121. The first remote vehicle 121 may abort the merge ahead intent and yield to the coming traffic on the road.

FIG. 6 depicts a flowchart for a method of responding to a request for a negotiation, according to one or more embodiments shown and described herein. The method 600 may be executed by the system 100 as depicted in FIGS. 1A-1D as described herein. Additionally, the method 600 will be described with reference to the elements depicted in FIGS. 2-5B.

Referring to FIGS. 1A-1D, 2 and 6, at step S610, a controller, for example, the controller of the ego vehicle 110, the controller of the server 240, or both, may obtain a maneuver message from the first remote vehicle 121. For example, referring to FIGS. 1A, 3A, 4A, and 5A, the controller may obtain a maneuver message related to a maneuver to be performed by the first remote vehicle 121, such as a plan to merge from a ramp ahead of the ego vehicle 110.

Referring back to FIGS. 1A-1D, 2 and 6, at step S620, the controller may determine a degree of conflict based on the position and the velocity of the ego vehicle 110, and driving information of the first remote vehicle 121. For example, referring to FIG. 1B, the controller may determine the position of the state of the ego vehicle 110 is in the no conflict domain 151 based on the position and the velocity of the ego vehicle 110, and driving information of the first remote vehicle 121. As another example, referring to FIG. 3B, the controller may determine the position of the state of the ego vehicle 110 is in the uncertain domain 152. As another example, referring to FIG. 4B, the controller may determine the position of the state of the ego vehicle 110 is in the uncertain domain 152. As another example, referring to FIG. 5B, the controller may determine the position of the state of the ego vehicle 110 is in the conflict domain 151.

Referring back to FIGS. 1A-1D, 2 and 6, at step S630, the controller may determine whether to accept the negotiation request based on the degree of conflict. For example, referring to FIG. 1C, in response to determining that the position of the state of the ego vehicle 110 is in the no conflict domain 151, the controller may accept the negotiation request based on the degree of conflict. As another example, referring to FIG. 3C, in response to determining that the position of the state of the ego vehicle 110 is in the uncertain domain 152, the controller may reject the negotiation request from the first remote vehicle 121. As another example, referring to FIG. 4D, the controller may determine whether accepting the negotiation request from the first remote vehicle 121 results in a conflict between the ego vehicle 110 and the second remote vehicle 122. The controller may determine whether accepting the negotiation request from the first remote vehicle 121 results in a conflict between the ego vehicle 110 and the third remote vehicle 123. In response to determining that accepting the negotiation request results in the conflict between the ego vehicle 110 and the second remote vehicle 122 or the conflict between the ego vehicle 110 and the third remote vehicle 123, the controller may reject the negotiation request from the first remote vehicle 121. In response to determining that accepting the negotiation request does not result in the conflict between the ego vehicle 110 and the second remote vehicle 122 or the conflict between the ego vehicle 110 and the third remote vehicle 123, the controller may accept the negotiation request from the first remote vehicle 121. As another example, referring to FIGS. 5A and 5B, in response to determining that the position of the state of the ego vehicle 110 is in the conflict domain 151 in the conflict chart 150, the ego vehicle 110 may reject the negotiation request.

Referring back to FIGS. 1A-1D, 2 and 6, at step S640, the controller may send a maneuver message including an alternative suggestion to the first remote vehicle 121 in response to determining to reject the negotiation request. For example, referring to FIG. 1C, in response to determining that the position of the state of the ego vehicle 110 is in the no conflict domain 151, the controller may send the negotiation request without sending an alternative suggestion to the first remote vehicle 121. As another example, referring to FIG. 3C, in response to determining that the position of the state of the ego vehicle 110 is in the uncertain domain 152, the controller may generate the alternative suggestion for suggested maneuver of the first remote vehicle 121 such that a position of an alternative state of the ego vehicle 110 in a new conflict chart 160 generated based on the suggested maneuver of the first remote vehicle 121 is in the no-conflict domain 163. The controller may send a maneuver message including the alternative suggestion to the first remote vehicle 121 in response to determining to reject the negotiation request. As another example, referring to FIG. 4E, in response to determining that accepting the negotiation request results in the conflict between the ego vehicle 110 and the second remote vehicle 122 or the conflict between the ego vehicle 110 and the third remote vehicle 123, the controller may send the alternative first suggestion to the first remote vehicle 121. The alternative first suggestion has the ego vehicle 110 make a room for the first remote vehicle 121 to make a lane change to the left. In response to determining that accepting the negotiation request from the first remote vehicle 121 results in a conflict between the ego vehicle 110 and the second remote vehicle 122, the controller may send the alternative second suggestion to the second remote vehicle 122. In the alternative second suggestion, the second remote vehicle 122 will slow down to give room for the ego vehicle 110 to make a lane change to the left, which in turn would allow for the first remote vehicle 121 to change lanes to the left. In embodiments, in response to determining that accepting the negotiation request from the first remote vehicle 121 does not result in a conflict between the ego vehicle 110 and the third remote vehicle 123, the controller may hold sending an alternative third suggestion to the third remote vehicle 123. The third remote vehicle 123 may drive in a same manner. In other embodiments, in response to determining to reject the negotiation request from the third remote vehicle 123, the controller may send the alternative third suggestion to the third remote vehicle 123. The alternative third suggestion has the third remote vehicle 123 slow down. As another example, referring to FIGS. 5A-5B, in response to determining that the position of the state of the ego vehicle 110 is in the conflict domain 151 in the conflict chart 150, the controller may reject the negotiation request without sending an alternative suggestion to the first remote vehicle 121.

Referring back to FIGS. 1A-1D, 2 and 6, at step S650, the controller may control the ego vehicle 110 based on a negotiation result. For example, referring to FIG. 1D, the controller may operate the ego vehicle 110 to drive based on the accepted negotiation request. The first remote vehicle 121 may merge ahead of the ego vehicle 110 without an undesired situation. The first remote vehicle 121 may merge ahead of the ego vehicle 110, while the ego vehicle 110 keeps driving in the same lane and without significantly changing the velocity, the acceleration, or the direction, or combinations thereof. As another example, referring to FIG. 3F, the controller may operate the ego vehicle 110 to drive based on a negotiation result, such as the alternative suggestion. The first remote vehicle 121 may merge ahead of the ego vehicle 110 without an undesired situation. With the alternative suggestion, the first remote vehicle 121 may merge ahead of the ego vehicle 110, while the ego vehicle 110 keeps driving in the same lane and without significantly changing the velocity, the acceleration, or the direction, or combinations thereof. As another example, referring to FIGS. 4G and 4H, in response to receiving the acceptance of the alternative first suggestion from the first remote vehicle 121 and the acceptance of the alternative second suggestion from the second remote vehicle 122, the controller may operate the ego vehicle 110 to drive based on result of negotiation, such as the accepted alternative first suggestion and the accepted alternative second suggestion. Referring to FIGS. 4G, the second remote vehicle 122 may slow down to make a room for the ego vehicle 110 to change into the leftmost lane. At the same time, the ego vehicle 110 may make a room for the first remote vehicle 121 to make a lane change to the left. Referring to FIGS. 4H, the ego vehicle 110 may change into the leftmost lane and the first remote vehicle 121 may change into the middle lane without an undesired situation, such as collision. In embodiments, in response to accepting the negotiation request from the first remote vehicle 121, the controller may operate the ego vehicle 110 based on result of negotiation, such as the accepted negotiation request. As another example, referring to FIGS. 5A-5B, in response to rejecting the negotiation request without sending an alternative suggestion to the first remote vehicle 121, the first remote vehicle 121 may abort the merge ahead intent and yield to the coming traffic on the road.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. An ego vehicle comprising:
a controller configured to:
obtain a maneuver message from a first remote vehicle, the maneuver message including a negotiation request related to a maneuver to be performed by the first remote vehicle;
determine a degree of conflict based on a position and a velocity of the ego vehicle, and driving information of the first remote vehicle, wherein the degree of conflict comprises a state of the ego vehicle in one of a no-conflict domain, an uncertain domain, or a conflict domain;
determine a response to the negotiation request, based on the degree of conflict and based on at least one other degree of conflict, wherein the at least one other degree of conflict is between the ego vehicle and one or more other remote vehicles;
send a maneuver message including an alternative suggestion to the first remote vehicle wherein the response comprises a rejection of the negotiation request; and
control the ego vehicle based on a negotiation result, wherein the negotiation result comprises a coordinated maneuver corresponding to the alternative suggestion or the negotiation request.

2. The ego vehicle according to claim 1, wherein the controller is further configured to:
generate a conflict chart comprising the no-conflict domain, the uncertain domain, and the conflict domain based on the position and the velocity of the ego vehicle and the driving information of the first remote vehicle, wherein the conflict chart comprises velocity values on an axis of the conflict chart; and determine the degree of conflict based on a position of a state of the ego vehicle in the conflict chart, the state of the ego vehicle comprising the position and the velocity of the ego vehicle.

3. The ego vehicle according to claim 2, wherein in response to determining that the position of the state of the ego vehicle is in the no-conflict domain, the controller is further configured to:
accept the negotiation request based on the degree of conflict; and
control the ego vehicle based on the accepted negotiation request.

4. The ego vehicle according to claim 2, wherein in response to determining that the position of the state of the ego vehicle is in the uncertain domain, the controller is further configured to:
generate the alternative suggestion for suggested maneuver of the first remote vehicle such that a position of an alternative state of the ego vehicle in a new conflict chart generated based on the suggested maneuver of the first remote vehicle is in the no-conflict domain; and
receive an acceptance of the alternative suggestion from the first remote vehicle.

5. The ego vehicle according to claim 2, wherein the controller is further configured to:
determine whether accepting the negotiation request from the first remote vehicle results in a conflict between the ego vehicle and a second remote vehicle; and
reject the negotiation request from the first remote vehicle in response to determining that accepting the negotiation request results in the conflict between the ego vehicle and the second remote vehicle.

6. The ego vehicle according to claim 5, wherein the controller is further configured to:
send an alternative first suggestion to the first remote vehicle after rejecting the negotiation request;
send an alternative second suggestion to the second remote vehicle after rejecting the negotiation request;
receive an acceptance of the alternative first suggestion from the first remote vehicle; and
receive an acceptance of the alternative second suggestion from the second remote vehicle.

7. The ego vehicle according to claim 6, wherein the controller is further configured to:
determine whether accepting the negotiation request from the first remote vehicle results in a conflict between the ego vehicle and a third remote vehicle;
send an alternative third suggestion to the third remote vehicle in response to determining that accepting the negotiation request from the first remote vehicle results in a conflict between the ego vehicle and a third remote vehicle; and
hold sending the alternative third suggestion to the third remote vehicle in response to determining that accepting the negotiation request from the first remote vehicle does not result in a conflict between the ego vehicle and a third remote vehicle.

8. The ego vehicle according to claim 7, wherein the ego vehicle, the first remote vehicle, and the second remote vehicle are in a different lane, and the ego vehicle and the third remote vehicle are in a same lane.

9. The ego vehicle according to claim 5, wherein the controller is further configured to:
accept the negotiation request from the first remote vehicle in response to determining that accepting the negotiation request does not result in the conflict between the ego vehicle and the second remote vehicle; and operate the ego vehicle based on the negotiation result.

10. The ego vehicle according to claim 2, the controller is further configured to:

in response to determining that the position of the state of the ego vehicle is in the conflict domain in the conflict chart, reject the negotiation request without sending an alternative suggestion to the first remote vehicle.

11. A method for responding a request for a negotiation, the method comprising:

obtaining a maneuver message from a first remote vehicle, the maneuver message including a negotiation request related to a maneuver to be performed by the first remote vehicle;

determining a degree of conflict based on a position and a velocity of an ego vehicle, and driving information of the first remote vehicle, wherein the degree of conflict comprises a state of the ego vehicle in one of a no-conflict domain, an uncertain domain, or a conflict domain;

determining a response to the negotiation request based on the degree of conflict and based on at least one other degree of conflict, wherein the at least one other degree of conflict is between the ego vehicle and one or more other remote vehicles;

sending a maneuver message including an alternative suggestion to the first remote vehicle wherein the response comprises a rejection of the negotiation request; and controlling the ego vehicle based on a negotiation result, wherein the negotiation result comprises a coordinated maneuver corresponding to the alternative suggestion or the negotiation request.

12. The method according to claim 11, further comprising:

generating a conflict chart comprising the no-conflict domain, the uncertain domain, and the conflict domain based on the position and the velocity of the ego vehicle and the driving information of the first remote vehicle, wherein the conflict chart comprises velocity values on an axis of the conflict chart; and determining the degree of conflict based on a position of a state of the ego vehicle in the conflict chart, the state of the ego vehicle comprising the position and the velocity of the ego vehicle.

13. The method according to claim 12, further comprising:

in response to determining that the position of the state of the ego vehicle is in the no-conflict domain:

accepting the negotiation request based on the degree of conflict; and controlling the ego vehicle based on the accepted negotiation request.

14. The method according to claim 12, further comprising:

in response to determining that the position of the state of the ego vehicle is in the uncertain domain:

generating the alternative suggestion for suggested maneuver of the first remote vehicle such that a position of an alternative state of the ego vehicle in a new conflict chart generated based on the suggested maneuver of the first remote vehicle is in the no-conflict domain; and receiving an acceptance of the alternative suggestion from the first remote vehicle.

15. The method according to claim 12, further comprising:

determining whether accepting the negotiation request from the first remote vehicle results in a conflict between the ego vehicle and a second remote vehicle; and rejecting the negotiation request from the first remote vehicle in response to determining that accepting the negotiation request results in the conflict between the ego vehicle and the second remote vehicle.

16. The method according to claim 15, further comprising:

sending an alternative first suggestion to the first remote vehicle after rejecting the negotiation request;

sending an alternative second suggestion to the second remote vehicle after rejecting the negotiation request;

receiving an acceptance of the alternative first suggestion from the first remote vehicle; and receiving an acceptance of the alternative second suggestion from the second remote vehicle.

17. The method according to claim 16, further comprising:

determining whether accepting the negotiation request from the first remote vehicle results in a conflict between the ego vehicle and a third remote vehicle;

sending a alternative third suggestion to the third remote vehicle in response to determining that accepting the negotiation request from the first remote vehicle results in a conflict between the ego vehicle and a third remote vehicle; and holding sending the alternative third suggestion to the third remote vehicle in response to determining that accepting the negotiation request from the first remote vehicle does not result in a conflict between the ego vehicle and a third remote vehicle.

18. The method according to claim 17, wherein the ego vehicle, the first remote vehicle, and the second remote vehicle are in a different lane, and the ego vehicle and the third remote vehicle are in a same lane.

19. The method according to claim 15, further comprising:

accepting the negotiation request from the first remote vehicle in response to determining that accepting the negotiation request does not result in the conflict between the ego vehicle and the second remote vehicle; and operating the ego vehicle based on the negotiation result.

20. The method according to claim 12, further comprising: in response to determining that the position of the state of the ego vehicle is in the conflict domain in the conflict chart, rejecting the negotiation request without sending an alternative suggestion to the first remote vehicle.

* * * * *